United States Patent
Chen et al.

(10) Patent No.: US 10,206,005 B2
(45) Date of Patent: Feb. 12, 2019

(54) MULTIMEDIA CONTROL METHOD AND SERVER

(71) Applicant: NANNING FUGUI PRECISION INDUSTRIAL CO., LTD., Nanning (CN)

(72) Inventors: Chun-Ming Chen, New Taipei (TW); Chih-Ching Wu, New Taipei (TW); Chiao-Ying Wu, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 34 days.

(21) Appl. No.: 15/636,764

(22) Filed: Jun. 29, 2017

(65) Prior Publication Data

US 2018/0343502 A1    Nov. 29, 2018

(30) Foreign Application Priority Data

May 27, 2017 (CN) .......................... 2017 1 0396512

(51) Int. Cl.
*H04N 21/472* (2011.01)
*H04N 21/431* (2011.01)
*H04N 21/482* (2011.01)
*H04N 21/475* (2011.01)

(52) U.S. Cl.
CPC ..... *H04N 21/47202* (2013.01); *H04N 21/431* (2013.01); *H04N 21/475* (2013.01); *H04N 21/47217* (2013.01); *H04N 21/482* (2013.01)

(58) Field of Classification Search
CPC ................................................. H04N 21/47202
USPC .......................................................... 715/719
See application file for complete search history.

(56) References Cited

U.S. PATENT DOCUMENTS

| | | | | |
|---|---|---|---|---|
| 2006/0159109 | A1* | 7/2006 | Lamkin | G06F 17/30174 370/401 |
| 2006/0161635 | A1* | 7/2006 | Lamkin | G06F 17/30041 709/217 |
| 2007/0136782 | A1* | 6/2007 | Ramaswamy | G11B 27/11 725/138 |
| 2009/0177792 | A1* | 7/2009 | Guo | H04N 7/17336 709/231 |
| 2012/0284744 | A1* | 11/2012 | Kumar | G06F 17/30053 725/34 |
| 2013/0167168 | A1* | 6/2013 | Ellis | H04N 5/44543 725/12 |

* cited by examiner

*Primary Examiner* — William D Titcomb
(74) *Attorney, Agent, or Firm* — ScienBiziP, P.C.

(57) ABSTRACT

A multimedia control method, which includes following parts. A first program preview request for a specified program channel is received from a set-top box. Multiple video clips are acquired according to the first program preview request and the multiple video clips are divided into at least a first video clip group and a second video clip group with sequence number. A first multicast channel is set for the first video clip group, and a second multicast channel is set for the second video clip group. The first video clip group is sent to the set-top box using the first multicast channel, and the second video clip group is sent to the set-top box using the second multicast channel.

10 Claims, 6 Drawing Sheets

| video clip group 1 | 1a | 2a | 3a | 4a | 5a | A |
|---|---|---|---|---|---|---|
| video clip group 2 | 6a | 7a | 8a | 9a | 10a | 11a | A |
| video clip group 3 | 12a | 13a | 14a | 15a | 16a | 17a | A |
| video clip group 4 | 18a | 19a | 20a | 21a | 22a | 23a | A |
| video clip group 5 | 24a | 25a | 26a | 27a | 28a | 29a | A |
| video clip group 6 | 30a | 31a | 32a | 33a | 34a | A |

| multicast 1_1 | 1a | 2a | 3a | 4a | 5a | A |
| --- | --- | --- | --- | --- | --- | --- |
| multicast 2_2 | 6a | 7a | 8a | 9a | 10a | 11a | A |
| multicast 3_3 | 12a | 13a | 14a | 15a | 16a | 17a | A |
| multicast 4_4 | 18a | 19a | 20a | 21a | 22a | 23a | A |
| multicast 5_5 | 24a | 25a | 26a | 27a | 28a | 29a | A |
| multicast 6_6 | 30a | 31a | 32a | 33a | 34a | A |

00 : 00        00 : 20

FIG 3

MULTIMEDIA CONTROL METHOD AND SERVER

FIELD

The subject matter herein generally relates to multimedia playback technologies.

BACKGROUND

Video On Demand (VOD) technology has been widely used to flexibly provide clients (e.g., TV) with multimedia programs which are pre-stored in a VOD sever. The VOD server may be connected with a client through one unicast link and provides one or more prepared multimedia programs to the client according to a request from the client. In other words, the VOD server needs to respectively establish a unicast link with each client, which occupies huge network bandwidth.

Furthermore, in a traditional user interface of VOD service, preview information is rendered on the client in the form of static images, which are not informative.

BRIEF DESCRIPTION OF THE DRAWINGS

Implementations of the present technology will now be described, by way of example only, with reference to the attached figures, wherein:

FIG. 2 is a diagram of an exemplary embodiment of video clip groups;

FIG. 3 is a diagram of an exemplary embodiment of a corresponding relationship between the video clip groups and multicast channels.

DETAILED DESCRIPTION

Figure 1:
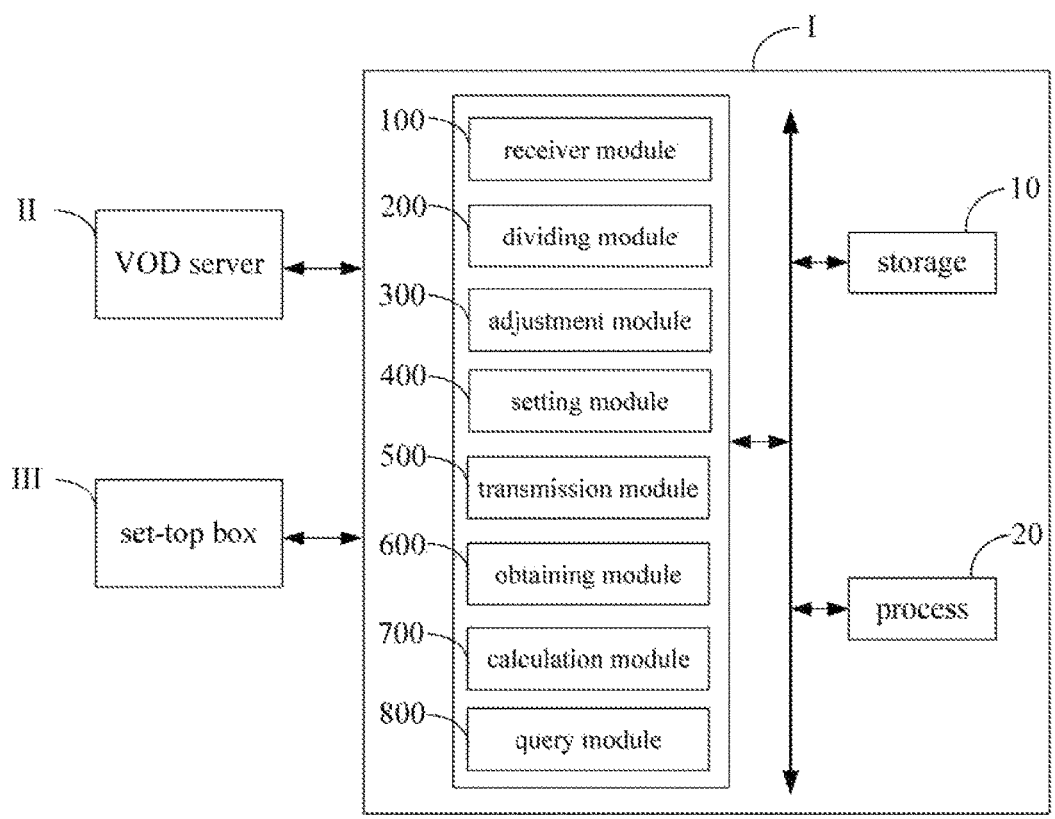
FIG. 1 is a diagram of an exemplary embodiment of a network architecture of a control system and functional modules of a server.

It will be appreciated that for simplicity and clarity of illustration, where appropriate, reference numerals have been repeated among the different figures to indicate corresponding or analogous elements. In addition, numerous specific details are set forth in order to provide a thorough understanding of an exemplary embodiment described herein. However, it will be understood by those of ordinary skill in the art an exemplary embodiments described herein can be practiced without these specific details. In other instances, methods, procedures, and components have not been described in detail so as not to obscure the related relevant feature being described. Also, the description is not to be considered as limiting the scope of an exemplary embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Referring to FIG. 1, a control system comprises a server I, a VOD server II and a set-top box III. The server I is connected with the VOD server II and the set-top box III, and the VOD server II can store large amounts of video data. The server I acquires video clips from the VOD server II and transmits the video clips to the set-top box III according to a program preview request from the set-top box III.

Referring to FIG. 1, the server I comprises a storage 10, a processor 20, a receiver module 100, a dividing module 200, an adjustment module 300, a setting module 400 and a transmission module 500.

The modules 100-500 can be executed by one or more processors (for example the processor 20) to achieve functionality. The storage 10 can store code and data of the server I. The module 100-500 will be described. The server □ receives a first program preview request for a specified program channel from the set-top box III, such as, in movies classification, "hot movies".

The receiver module 100 receives the first program preview request. The dividing module 200 acquires video clips of all of movies in the "hot movies" and divides the video clips into multiple video clip groups, wherein a play time length of each of the video clip groups is exactly the same or similar and each of the video clip groups is assigned a single sequence number. In the embodiment, the video clip can be a trailer for a movie. In an embodiment, after division by the dividing module 200, the adjustment module 300 acquires multiple commercial video clips and inserts the multiple commercial video clips into the multiple video clip groups to adjust the play time length of each of the multiple video clip groups, to achieve a first play time length.

FIG. 2 is a diagram of video clip groups. Video clips of all of movies in the "hot movies" (the video clips 1a-34a corresponding to movies (1)-(34)) is divided into six video clip groups (1, 2, 3, 4, 5, and 6). Such as, the video clip 1a is of the movies (1), the video clip 2a is of the movies (2), the video clip 3a is of the movies (3), and so on. A play time length of each of the video clip groups is adjusted to 20 minutes. The "A" stands for the commercial video clips and content of each video clip may be same or different.

As shown in FIG. 3, the setting module 400 sets six multicast channels 1_1-6_6 which in turn correspond to the video clip groups 1-6, thus, the multicast channel 1_1 corresponds to the video clip group 1, and the multicast channel 2_2 corresponds to the video clip group 2. The transmission module 500 sends video clips of the video clip groups 1-6 to the set-top box III using the multicast channels 1_1-6_6 according to sequence numbers of the video clip groups 1-6.

In an embodiment, the receiver module 100 receives a second program preview request for a specified program in the specified program channel from the set-top box III, for example, a preview request of the video clip 3a of the movie (3) in the "hot movies". The transmission module 500 acquires the video clips 3*a* from the VOD server II according to the second program and sends the video clips 3*a* to the set-top box III using a unicast channel. After sending the video clips 3*a* to the set-top box III, the transmission module 500 also acquires the video clips 4*a* and the video clip 5*a* which follow the video clip 3*a* of the video clip group 1, from the VOD server and sends the video clips 4*a* and 5*a* to the set-top box III using the unicast channel.

In the embodiment, the server I further comprises an obtaining module 600, a calculation module 700, and a query module 800, the modules 600-800 will be described on basis of above contents.

The obtaining module 600 obtains a second play time length and a sum of play time length of the video 3*a* (the target video clip), the video clip 4*a*, and the video clip 5*a*. The second play time length is a length of time that has been played of a video clip (or may be video clips) of the target video clip group when the second program preview request (a preview request of the video clip 3*a*) is received. For example, the obtaining module 600 receives information that the second play time length is 3 minutes and the sum of play time length is 12 minutes. In an embodiment, the obtaining module 600 obtain the second play time length from the set-top box III, or may be obtain a play time length between sending the video clip 1*a* to the set-top box III using the multicast channel and sending the video clip 3*a* to the set-top box III using the unicast channel.

The calculation module 700 sums up the second play time length (3 minutes) and the sum of play time lengths (12 minutes) to calculate a third play time length (15 minutes) and calculates a time length difference (5 minutes or 300 seconds) between the first play time length (20 minutes) and the second play time length (15 minutes). The query module 800 selects a replacement video clip which has a play time length equal to or less than 300 seconds from the video clip groups 2-6. In the embodiment, the query module 800 selects the replacement video clip from the video clip groups 2-6 according to a formula (X+Y/2) % Y. In the formula, X represents the sequence number of the video clip group 1, Y represents total number of the video clip groups 1_1-6_6, and the query module 800 selects the replacement video clip from the video clip group 4 according to the formula (X+Y/2) % Y.

The transmission 500 sends the replacement video clip to the set-top box III using the unicast channel when the play time length of the replacement video clip is equal to 300 seconds.

When the play time length of the replacement video clip is less than 300 seconds (such as, 205 seconds), the transmission 500 sends the replacement video clip and a first commercial video clip (or first commercial video clips) which have a sum of play time lengths of 95 seconds (the difference between 300 seconds and 205 seconds) to the set-top box III using the unicast channel.

The transmission 500 sends a second commercial video clip (or second commercial video clips) which has a play time length of 300 seconds to the set-top box III using the unicast channel when the replacement video clip is nonexistent in the video clip group 4.

Figure 4:
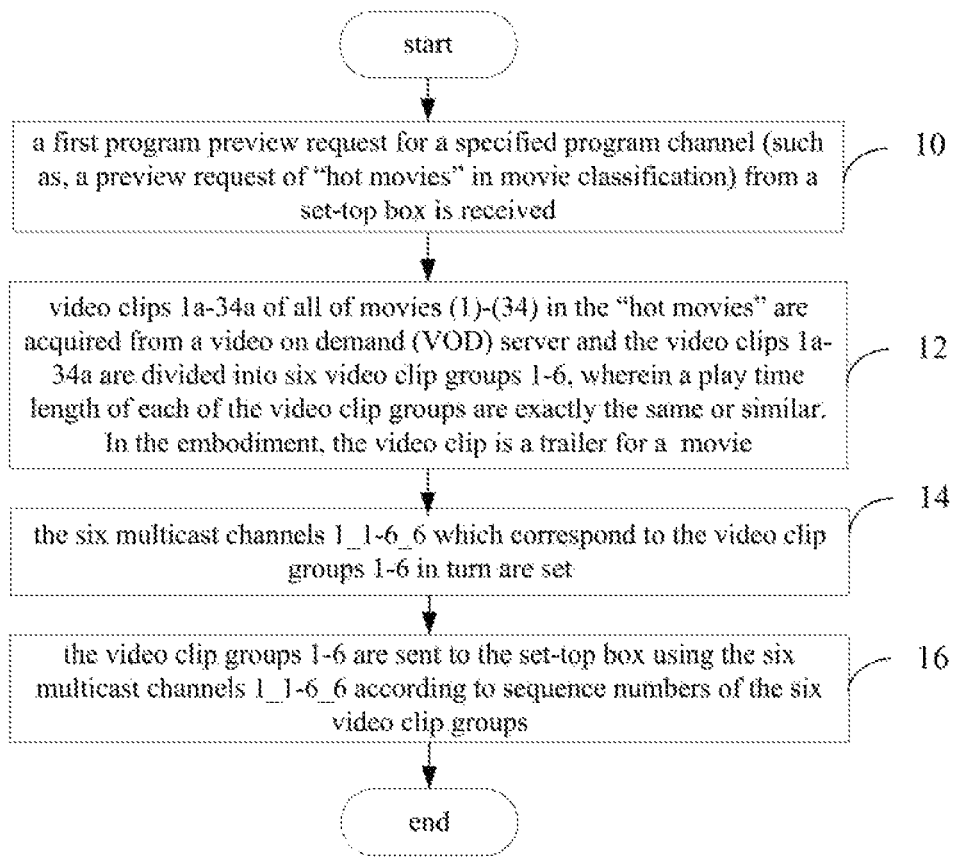
FIG. 4 is a flowchart of an exemplary embodiment of a multimedia control method.

FIG. 4 is a flowchart of an exemplary embodiment of a control method for multimedia.

At block 10, a first program preview request for a specified program channel (such as, a preview request of "hot movies" in movie classification) from a set-top box is received.

At block 12, video clips 1*a*-34*a* of all of movies (1)-(34) in the "hot movies" are acquired from a video on demand (VOD) server and the video clips 1*a*-34*a* are divided into six video clip groups 1-6, wherein a play time length of each of the video clip groups is exactly the same or similar. In the embodiment, the video clip is a trailer for a corresponding movie.

At block 14, the six multicast channels 1_1-6_6 which correspond to the video clip groups 1-6 in turn are set.

At block 16, the video clip groups 1-6 are sent to the set-top box using the six multicast channels 1_1-6_6 according to sequence numbers of the six video clip groups.

Figure 5:
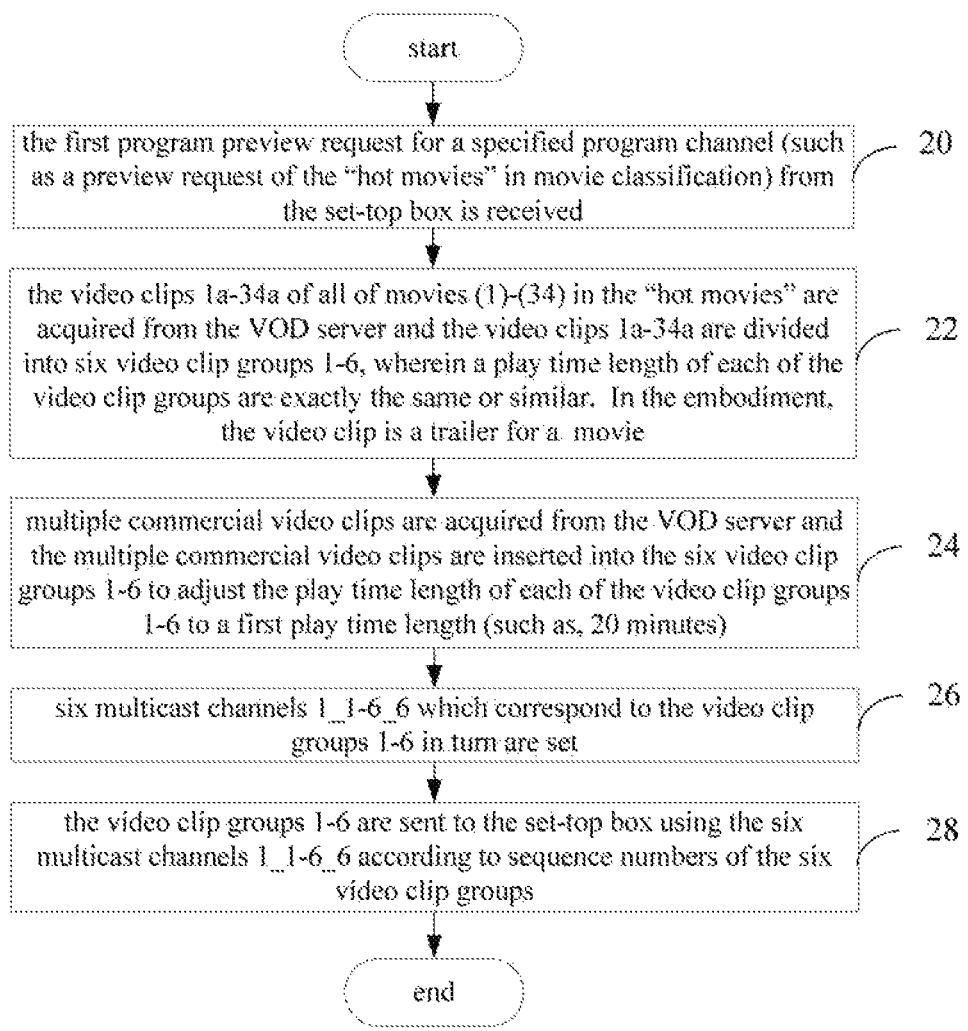
FIG. 5 is a flowchart of another exemplary embodiment of a multimedia control method.

FIG. 5 is a flowchart of another exemplary embodiment of a control method for multimedia.

At block 20, the first program preview request for a specified program channel (such as a preview request of the "hot movies" in movie classification) from the set-top box is received.

At block 22, the video clips 1*a*-34*a* of all of movies (1)-(34) in the "hot movies" are acquired from the VOD server and the video clips 1*a*-34*a* are divided into six video clip groups 1-6, wherein a play time length of each of the video clip groups is exactly the same or similar. In the embodiment, the video clip is a trailer for a movie.

At block 24, multiple commercial video clips are acquired from the VOD server and the multiple commercial video clips are inserted into the six video clip groups 1-6 to adjust the play time length of each of the video clip groups 1-6 to a first play time length (such as, 20 minutes).

At block 26, six multicast channels 1_1-6_6 which in turn correspond to the video clip groups 1-6 are set.

At block 28, the video clip groups 1-6 are sent to the set-top box using the six multicast channels 1_1-6_6 according to sequence numbers of the six video clip groups.

Figure 6:
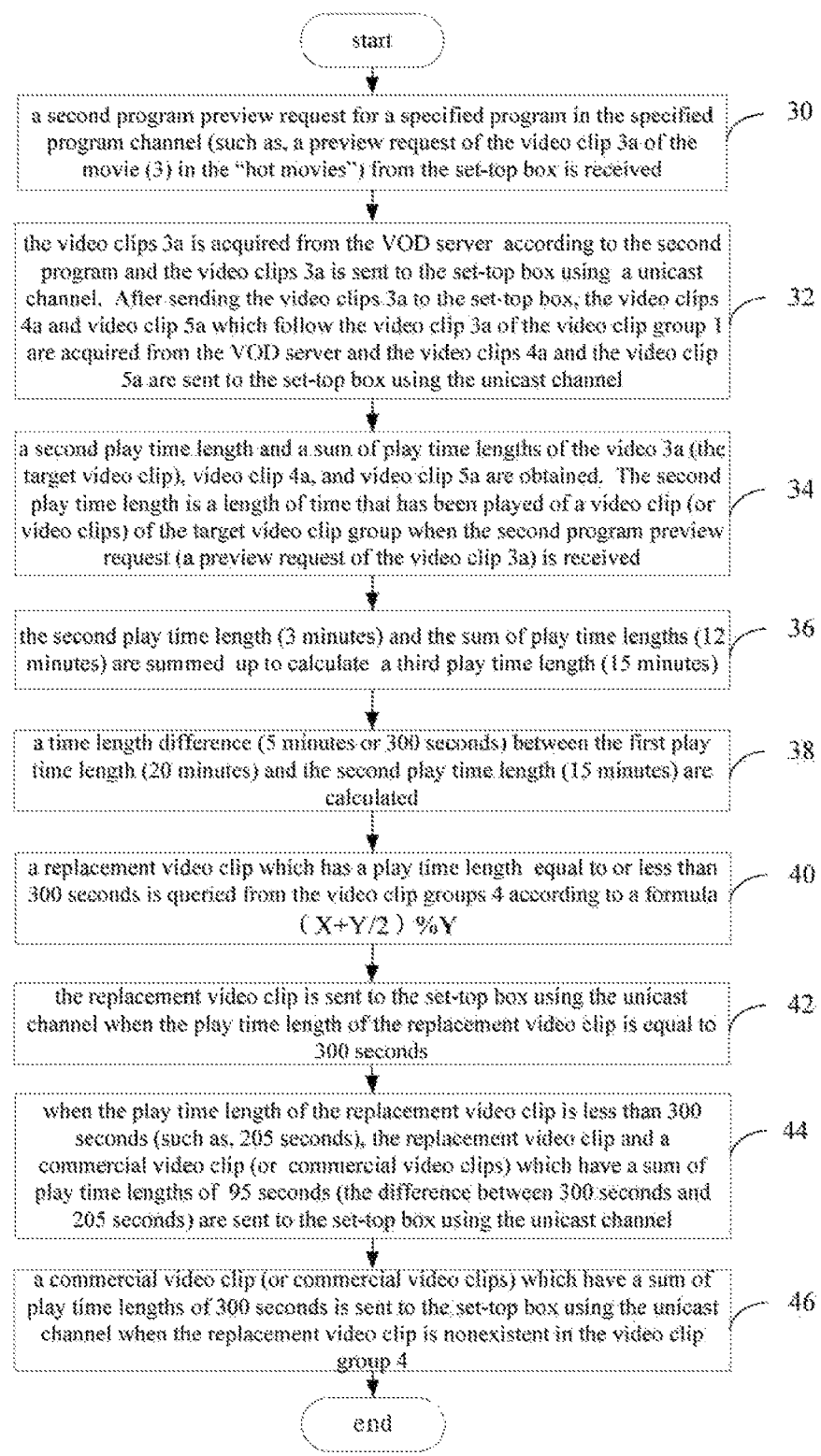
FIG. 6 is a flowchart of another exemplary embodiment of a multimedia control method.

FIG. 6 is a flowchart of another exemplary embodiment of a control method for multimedia.

At block 30, a second program preview request for a specified program in the specified program channel (such as, a preview request of the video clip 3*a* of the movie (3) in the "hot movies") from the set-top box is received.

At block 32, the video clips 3*a* is acquired from the VOD server according to the second program and the video clips 3*a* is sent to the set-top box using a unicast channel. After sending the video clips 3*a* to the set-top box, the video clips 4*a* and 5*a* which follow the video clip 3*a* of the video clip group 1 are acquired from the VOD server and the video clips 4*a* and 5*a* are sent to the set-top box using the unicast channel.

At block 34, a second play time length and a sum of play time lengths of the video 3*a* (the target video clip), video clip 4*a*, and video clip 5*a* are obtained. The second play time length is a length of time that has been played of a video clip (or may be video clips) of the target video clip group when the second program preview request (a preview request of the video clip 3*a*) is received.

At block 36, the second play time length (3 minutes) and the sum of play time lengths (12 minutes) are summed up to calculate a third play time length (15 minutes).

At block 38, a time length difference (5 minutes or 300 seconds) between the first play time length (20 minutes) and the second play time length (15 minutes) are calculated.

At block 40, a replacement video clip which has a play time length equal to or less than 300 seconds is queried from the video clip groups 4 according to a formula (X+Y/2) % Y.

At block 42, the replacement video clip is sent to the set-top box using the unicast channel when the play time length of the replacement video clip is equal to 300 seconds.

At block 44, when the play time length of the replacement video clip is less than 300 seconds (such as, 205 seconds), the replacement video clip and a commercial video clip (or commercial video clips) which have a sum of play time lengths of 95 seconds (the difference between 300 seconds and 205 seconds) are sent to the set-top box using the unicast channel.

At block 46, a commercial video clip (or commercial video clips) which have a sum of play time lengths of 300 seconds is sent to the set-top box using the unicast channel when the replacement video clip is nonexistent in the video clip group 4.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included within the scope of this disclosure and protected by the following claims.

What is claimed is:

1. A server, the server comprising:
    at least one processor;
    a non-transitory storage medium system coupled to at least the one processor and configured to store one or more programs that are to be executed by the at least one processor, the one or more programs comprises instructions for:
    receiving a first program preview request for a specified program channel from a set-top box;
    acquiring video clips of the specified program channel according to the first program preview request;
    dividing the video clips into at least a first video clip group and a second video clip group and assigning a sequence number to the first video clip group and a sequence number to the second video clip group, wherein a play time length of the first video clip group and a play time length of the second video clip group are exactly the same or similar;
    setting a first multicast channel for the first video clip group, and a second multicast channel for the second video clip group; and
    sending video clips of the first video clip group to the set-top box using the first multicast channel, and sending video clips of the second video clip group to the set-top box using the second multicast channel according to the sequence number of the first video clip group and the sequence number of the second video clip group.

2. The server as claimed in claim 1, wherein the one or more programs further comprises instructions for:
    receiving a second program preview request for a specified program in the specified program channel from the set-top box;
    acquiring a target video clip of the specified program according to the second program request; and
    sending the target video clip to the set-top box using a unicast channel.

3. The server as claimed in claim 2, wherein the one or more programs further comprises instructions for:
    inserting at least a commercial video clip to the first video clip group and the second video clip group to adjust a play time length of the first video clip group to a first play time length and a play time length of the second video clip group to the first play time length; and
    sending video clips of the new first video clip group to the set-top box using the first multicast channel, and sending video clips of the new second video clip group to the set-top box using the second multicast channel according to the sequence number.

4. The server as claimed in claim 3, wherein the target video clip belongs to a target video clip group, and the one or more programs further comprises instructions for:
    sending video clips subsequent to the target video clip in the target video clip group to the set-top box using the unicast channel;
    obtaining a second play time length and a sum of play time lengths of the video clips which follow the target video clip in the target video clip group, wherein the second play time length is a length of time that has been played of a video clip of the target video clip group when the second program preview request is received;
    summing up the second play time length and the sum of play time length to get a third play time length;
    calculating a time length difference, N seconds, between the first play time length and the third play time length;
    selecting a replacement video clip from other video clip groups except the target video clip group, wherein a play time length of the replacement video clip is equal to or less than N seconds;
    when the play time length of the replacement video clip is equal to N seconds, sending the replacement video clip to the set-top box using the unicast channel; and
    when the play time length of the replacement video clip is M seconds and M is less than N, sending the replacement video clip and a commercial video clip or commercial video clips whose play time length is (N−M) seconds to the set-top box.

5. The server as claimed in claim 3, wherein and the one or more programs further comprises instructions for:
    when the replace video clip is nonexistent, sending a commercial video clip or commercial video clips whose play time length is M seconds to the set-top box.

6. A control method for multimedia, the method comprising:
    receiving a first program preview request for a specified program channel from a set-top box;
    acquiring video clips of the specified program channel according to the first program preview request;
    dividing the video clips into at least a first video clip group and a second video clip group and assigning sequence number to the video clip group and a sequence number to the second video clip group, wherein a play time length of the first video clip group and a play time length of the second video clip group are exactly the same or similar;
    setting a first multicast channel for the first video clip group, and a second multicast channel for the second video clip group; and
    sending video clips of the first video clip group to the set-top box using the first multicast channel, and sending video clips of the second video clip group to the set-top box using the second multicast channel according to the sequence number of the first video clip group and the sequence number of the second video clip group.

7. The control method as claimed in claim 6, further comprising:

receiving a second program preview request for a specified program in the specified program channel from the set-top box;

acquiring a target video clip of the specified program according to the second program request; and sending the target video clip to the set-top box using a unicast channel.

8. The control method as claimed in claim 7, further comprising:

inserting at least a commercial video clip to the first video clip group and the second video clip group to adjust a play time length of the first video clip group to a first play time length and a play time length of the second video clip group to the first play time length; and sending video clips of the new first video clip group to the set-top box using the first multicast channel, and sending video clips of the new second video clip group to the set-top box using the second multicast channel according to the sequence number.

9. The control method as claimed in claim 8, wherein the target video clip belongs to a target video clip group, the method further comprising:

sending video clips subsequent to the target video clip in the target video clip group to the set-top box using the unicast channel;

obtaining a second play time length and a sum of play time lengths of the video clips which follow the target video clip in the target video clip group, wherein the second play time length is a length of time that has been played of a video clip of the target video clip group when the second program preview request is received;

summing up the second play time length and the sum of play time length to get a third play time length;

calculating a time length difference, N seconds, between the first play time length and the third play time length;

selecting a replacement video clip from other video clip groups except the target video clip group, wherein a play time length of the replacement video clip is equal to or less than N seconds;

when the play time length of the replacement video clip is equal to N seconds, sending the replacement video clip to the set-top box using the unicast channel; and when the play time length of the replacement video clip is M seconds and M is less than N, sending the replacement video clip and a commercial video clip or commercial video clips whose play time length is (N–M) seconds to the set-top box.

10. The control method as claimed in claim 9, wherein further comprising:

when the replace video clip is nonexistent, sending a commercial video clip or commercial video clips whose play time length is M seconds to the set-top box.

* * * * *